Jan. 10, 1961 C. E. CONNOLLY ET AL 2,967,658

RECORD PUNCHING MACHINE

Filed Dec. 26, 1957 5 Sheets-Sheet 1

INVENTOR
CHARLES E. CONNOLLY
LAWRENCE A. WILSON
BY G. R. Gugger
AGENT

Jan. 10, 1961 C. E. CONNOLLY ET AL 2,967,658

RECORD PUNCHING MACHINE

Filed Dec. 26, 1957 5 Sheets-Sheet 2

Jan. 10, 1961 C. E. CONNOLLY ET AL 2,967,658

RECORD PUNCHING MACHINE

Filed Dec. 26, 1957 5 Sheets-Sheet 4

2,967,658
Patented Jan. 10, 1961

2,967,658

RECORD PUNCHING MACHINE

Charles E. Connolly, Endicott, and Lawrence A. Wilson, Apalachin, N.Y., assignors to International Business Machines Corporation, New York, N.Y., a corporation of New York

Filed Dec. 26, 1957, Ser. No. 705,349

2 Claims. (Cl. 234—13)

This invention relates to punching machines and more particularly to the card controlled type which provides for selective punching of data on one card which is taken or transferred from another card.

The present invention, solely as a convenience in disclosure of the invention, has been shown in the drawings and will be described hereinafter as applied to a reproducing machine of the type disclosed in Patent No. 2,032,805.

In the illustrative embodiment of the invention both the read side and the punch side of the reproducing machine are used to carry out a straight reproducing operation wherein a blank card at the punching station is punched with data sensed on a pattern card at the reproducing brushes. In the instant application, a matrix type punching mechanism is employed for carrying out a punching operation in two steps. First, the card to be punched is fed into the opening between the die and stripper and located under the punches so as to punch the information in all of the uneven columns. After punching the uneven columns, the card is shifted one column and the information in the even columns is punched.

An object of the present invention is to provide an improved machine for performing punching operations in which the punching is performed at a high rate of speed.

A further object of the present invention is to provide a simplified fast operating punching mechanism for punching a record card in two steps.

A still further object of the present invention is to provide a novel positive acting eject mechanism for removing a record from the punching station.

Other objects of the invention will be pointed out in the following description and claims and illustrated in the accompanying drawings, which disclose, by way of example, the principle of the invention and the best mode, which has been contemplated, of applying that principle.

The present improvements are preferably incorporated in the form of card perforating machine fully shown and described in the Patent No. 2,032,805 to C. D. Lake, dated March 3, 1936. Such a card perforating machine is known in the art as the IBM reproducing punch. In the following description, only a brief explanation will be given of the construction and operation of the machine as far as it pertains to the present invention. To obtain further details of construction and operation of the illustrative machine, reference may be had to the afore-mentioned patent.

Figure 7:
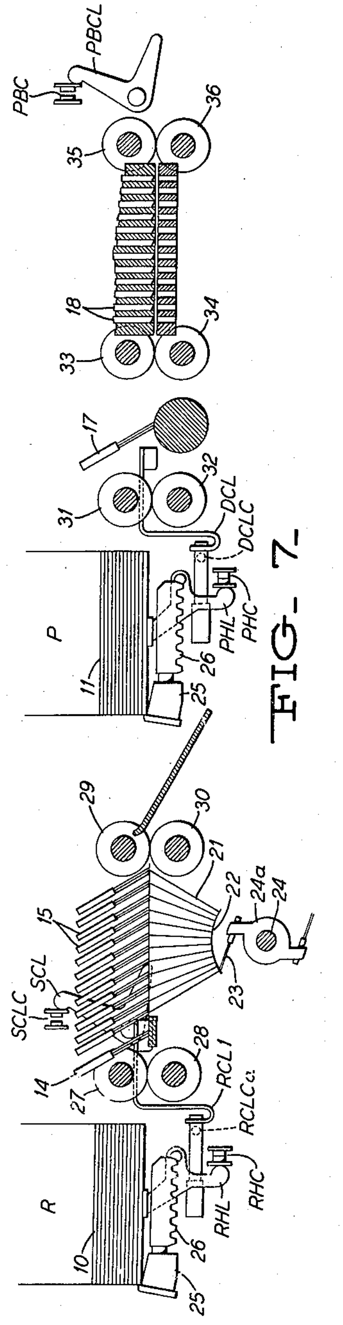
Fig. 7 is a diagrammatic view showing the particular card feeding mechanism associated with each side of the punching machine along with the analyzing station and the punching station.

A general idea of the operation of the punching machine to which the present invention is applied may be gathered by observing the diagrammatic view shown in Fig. 7. There it is noted that there are a number of pattern cards 10 in the hopper R and another bunch of blank record cards 11 in the hopper P. The cards are fed singly but concurrently from both hoppers and are then shifted in synchronism between sensing and punching stations before being deposited in stackers.

The pattern card 10 encounters first master sensing brushes 14, then a plurality of sensing brushes 15, and then, if desired, a series of checking brushes (not shown) before being deposited in a stacker. The record card 11 passes the master brushes 17, then a plurality of punches 18, and then, if desired, a set of punch brushes (not shown) before being deposited in a stacker.

There are electrical connections between the brushes 15 and the punches 18, so that when a perforation is sensed in a pattern card 10 a corresponding perforation is punched in the related record card 11. The operation of the brushes 14 and 17 and the checking brushes will not be described since they are not an essential part of the present invention.

Figures 5, 8:
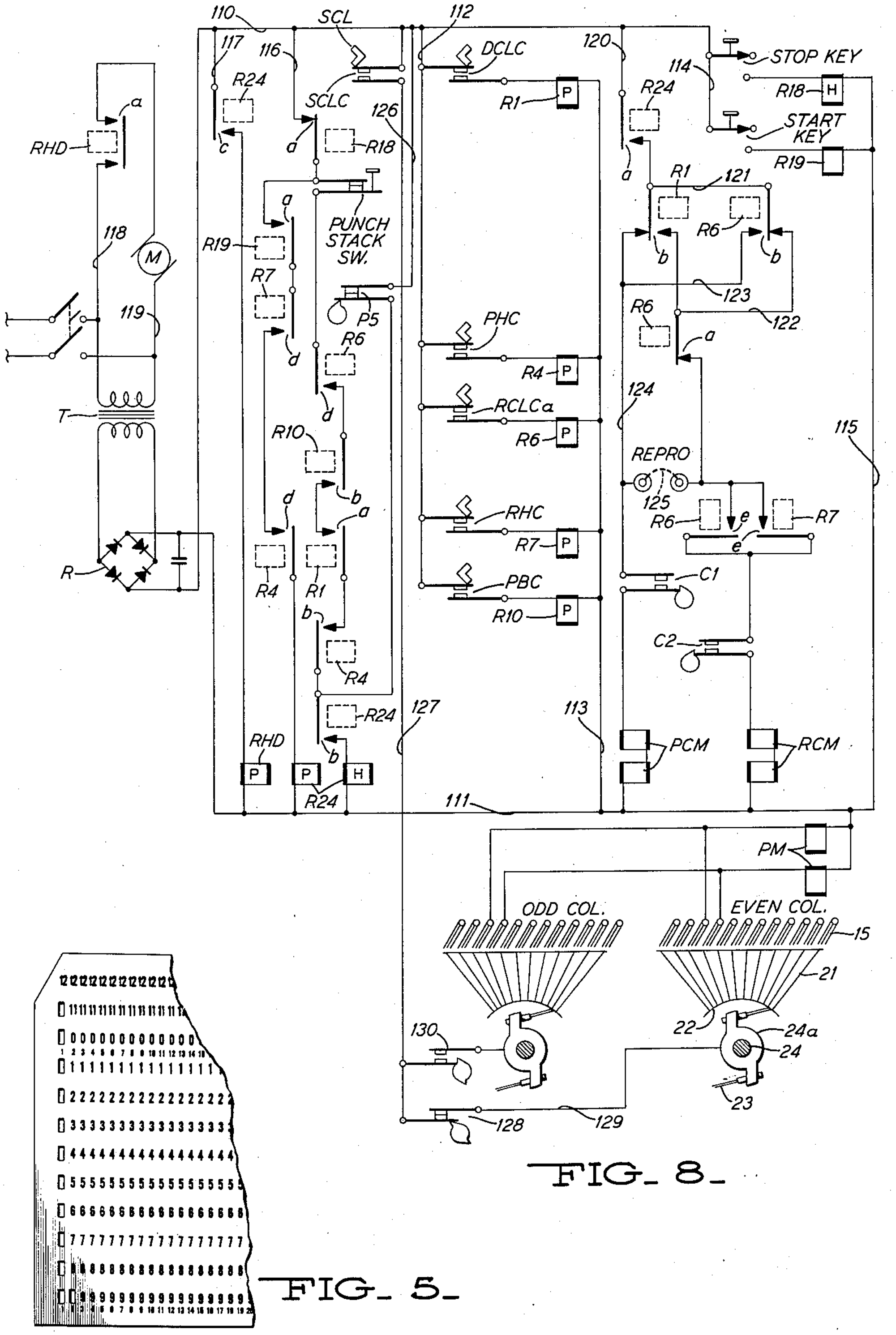
Fig. 5 is a detail view of a portion of a record card.
Fig. 8 is a wiring diagram.

Fig. 5 shows a portion of a perforated card which may act as a master card. It is noted that the card is perforated in 11 out of the 12 index point positions in column 1 and in the 9 index point position in column 2.

Where the terms "record card column" and "index points" are referred to, it will be understood that they mean that the record card is divided into parallel columns (as illustrated in Fig. 5) each column having nine or more different positions or index points. Each index point represents a different value by virtue of its location from a reference edge of the card, so that when a perforated card is analyzed by passing it through a tabulating machine in a columnar direction, or analyzed at rest, the index points will control associated representing devices. The term "record card column containing index points" is, therefore, defined as a card column containing a series of different index points having varying control functions by virtue of their differential locations in the column.

*Card analyzing mechanism*

In accordance with the present invention, the card to be punched is punched in two steps; that is, one half of the card at the punching station is punched after which the card is shifted slightly and then the other half of the card is punched. Accordingly, the card analyzing mechanism in the read side of the machine is of the type which is capable of repetitively scanning a card at rest so that each pattern card may be analyzed twice, once for each punching operation of its related detail card.

Such an analyzing mechanism is well known in the art and is fully shown and described in the Patent No. 2,687,-086 to H. S. Beattie et. al., dated August 24, 1954. Accordingly, in the following description, only a brief explanation will be given of the construction and operation of the mechanism as far as it pertains to the present invention.

Referring to Fig. 7, the analyzing mechanism comprises a plurality of angularly positioned metal analyzing brushes 15 which encounter the perforations and pass through to complete electrical circuits. For each card column a set of brushes 15 makes selective contact through the perforations in the column to extensions 21 of emitter contact points 22. Commutator brushes 23 driven by the shaft 24 clockwise make successive contact with the contact points 22 to transmit impulses in the order 9, 8, 7, 6, 5, 4, 3, 2, 1, 0, X, R at differential times, dependent upon the location of the perforation. As will be seen in connection with the wiring diagram, by an electrical connection to each commutator, current is supplied to the brushes 23.

The above-described arrangement of analyzing brushes and commutator is duplicated for each card column and with the shaft 24 driven one revolution per machine cycle it can be seen that each card at the reading station is scanned twice by the analyzing brushes.

The driving connections for the commutator shaft as well as the card feeding mechanism, feed roller shafts and various cam shafts are not shown herein, but it is understood that these shafts are suitably connected to be constantly driven from a motor M shown diagrammatically in Fig. 8 to perform the machine functions.

*Card feed mechanism*

A conventional card picker mechanism is provided to feed cards singly from the supply hoppers R and P and each mechanism includes a card picker 25 (Fig. 7) having a swivel mounting on a slidably mounted rack 26. A well-known one-revolution clutch and cam mechanism (not shown) is provided to oscillate each card picker once each machine cycle. Reference may be had to the afore-mentioned Patent No. 2,687,086 for a detailed showing of the card picker operating mechanism.

From the read hopper R each card is fed via the picker and a pair of feed rollers 27, 28, into the analyzing station where it is retained at rest to be twice analyzed by the brushes 15. Suitable well-known mechanism (not shown) is provided at the analyzing station for momentarily arresting each card received and, after the card has been twice analyzed, for ejecting it into a set of feed rollers 29, 30, which feed the card to a suitable stacker drum or hopper or to other operating stations, if desired. Reference may be had to the afore-mentioned Patent No. 2,687,086 or to the Patent No. 2,510,559 to G. F. Daly, dated June 6, 1950, for a detailed showing of the card handling mechanism for processing the card at the analyzing station. It will suffice to say here that the analyzing station is provided with card stops and aligners which align the card along the horizontal edges to accurately correlate the horizontal rows of index points of the card with the related rows of analyzing brushes. The horizontal edges of the cards define the longer edges thereof because as the card is ordinarily held up for view by an operator the longer edges are horizontal and the shorter (left and right marginal edges) are the vertical edges.

There is also provided in the card handling mechanism at the analyzing station a pair of reciprocable gripper frames, one at each side of the machine. The gripper frames each carry card grippers for gripping the edges of the card and means are provided for closing and reopening the grippers. It will be understood that during a forward stroke of the gripper frames in the direction of card feed, the grippers will be closed to feed the card out of the analyzing station via the feed rollers 29 and 30. On the return stroke of the gripper frames back toward the read hopper R, the grippers will be open so as to not disturb the card that has been fed into the analyzing station.

The blank cards in the punch hopper P are fed out of the hopper by the card picker, past the sensing brushes 17 by the feed rollers 31, 32 and into the punching station by the feed rollers 33 and 34. At the punching station, the card is aligned and momentarily held twice for the two step punching operation after which it is ejected into the feed rollers 35, 36 which convey the card to other operating stations or to a suitable stacker mechanism.

Figure 3:
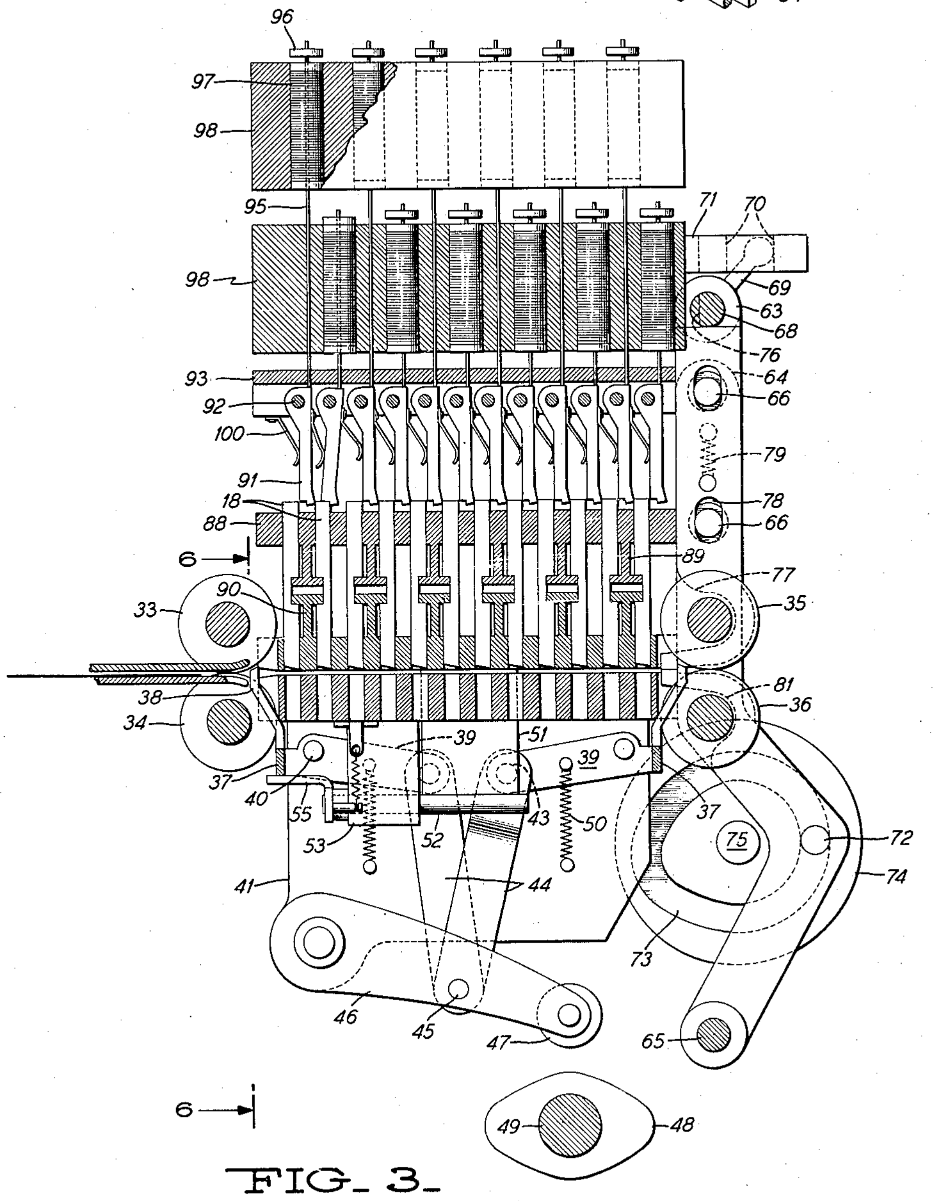
Fig. 3 is a side elevation view of the punching mechanism showing the card positioning means.
Figure 6:
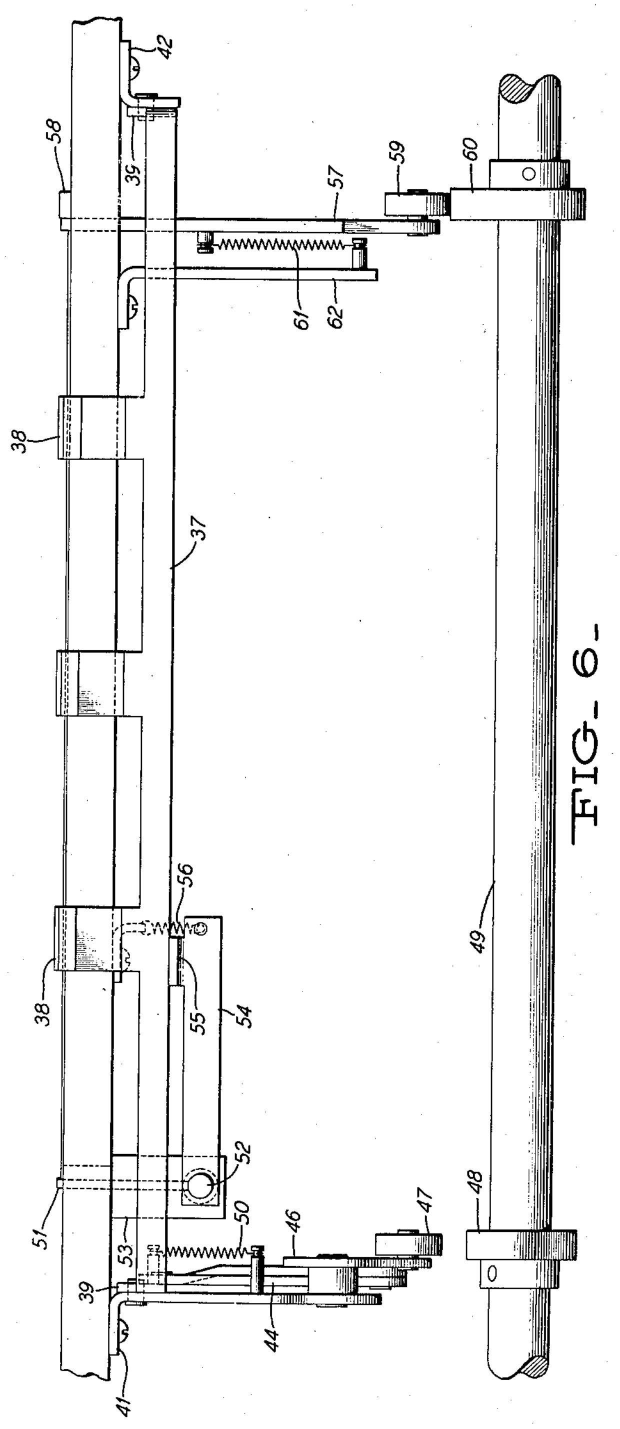
Fig. 6 is a view taken on line 6—6 of Fig. 3 and shows the card positioning mechanism.

Referring to Figs. 3 and 6, there is provided a pair of aligner bails 37, one at the entrance to the punching station and the other at the exit, with each bail having a plurality of tabs 38 for engaging the leading and trailing edges of a card to be positioned beneath the punches. Each aligner bail has a bent arm portion 39 at each end and through these arms and suitable studs, such as indicated at 40, the aligner bails are pivotally mounted between brackets 41 and 42 fastened to the underside of the punch and die mechanism. The arm portions at the left-hand end of the aligner bails have their extremities pivotally connected, through studs 43, to the upper extremities of a pair of toggle links 44. The lower extremities of the toggle links are pivoted together on a stud 45 fastened to a follower arm 46 which is pivoted to the bracket 41. The follower arm carries a roller 47 which coacts with a cam 48 fastened on a continuously running shaft 49. In the position shown in Fig. 3, the cam 48 is ineffective and the aligner bails have been pivoted up into the card feed path through the action of a pair of springs 50. This upward movement of the bails is timed to effectively arrest the card being fed into the punching station as the card reaches the desired position beneath the punches, the bails also serving to clamp the card along its horizontal edges to prevent movement of the card during a punching operation.

When the high portion of cam 48 engages the roller 47, the arm 46 is pivoted upward causing the toggle links 44 to swing the bails downward out of the card feed path. While shaft 49 makes one revolution for each machine cycle, the cam 48 is arranged to pivot the arm 46 twice each machine cycle since it is desired to lower the bails at the end of the first punching operation in each cycle to permit shifting of the card and again at the end of the second punching operation in each cycle to permit the ejection of the card punched and the feeding in of the next succeeding card to be punched.

Figure 4:
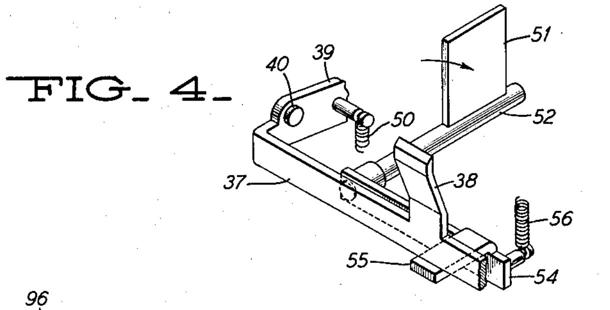
Fig. 4 is a detailed view of part of the card positioning mechanism.

To shift the card each cycle is between punching steps there is provided a card patter 51 fixed to a rod 52 which is rotatably mounted in a support block 53. As shown in Figs. 4 and 6, the rod 52 has fastened thereon one end of a bar 54 with the other end of the bar having a turned over ear 55 which extends beneath the bail 37 located at the entrance to the punching station. A spring 56 biases the bar 54 and rod 52 so that ear 55 is in engagement with the undersurface of the bail.

Figure 1:
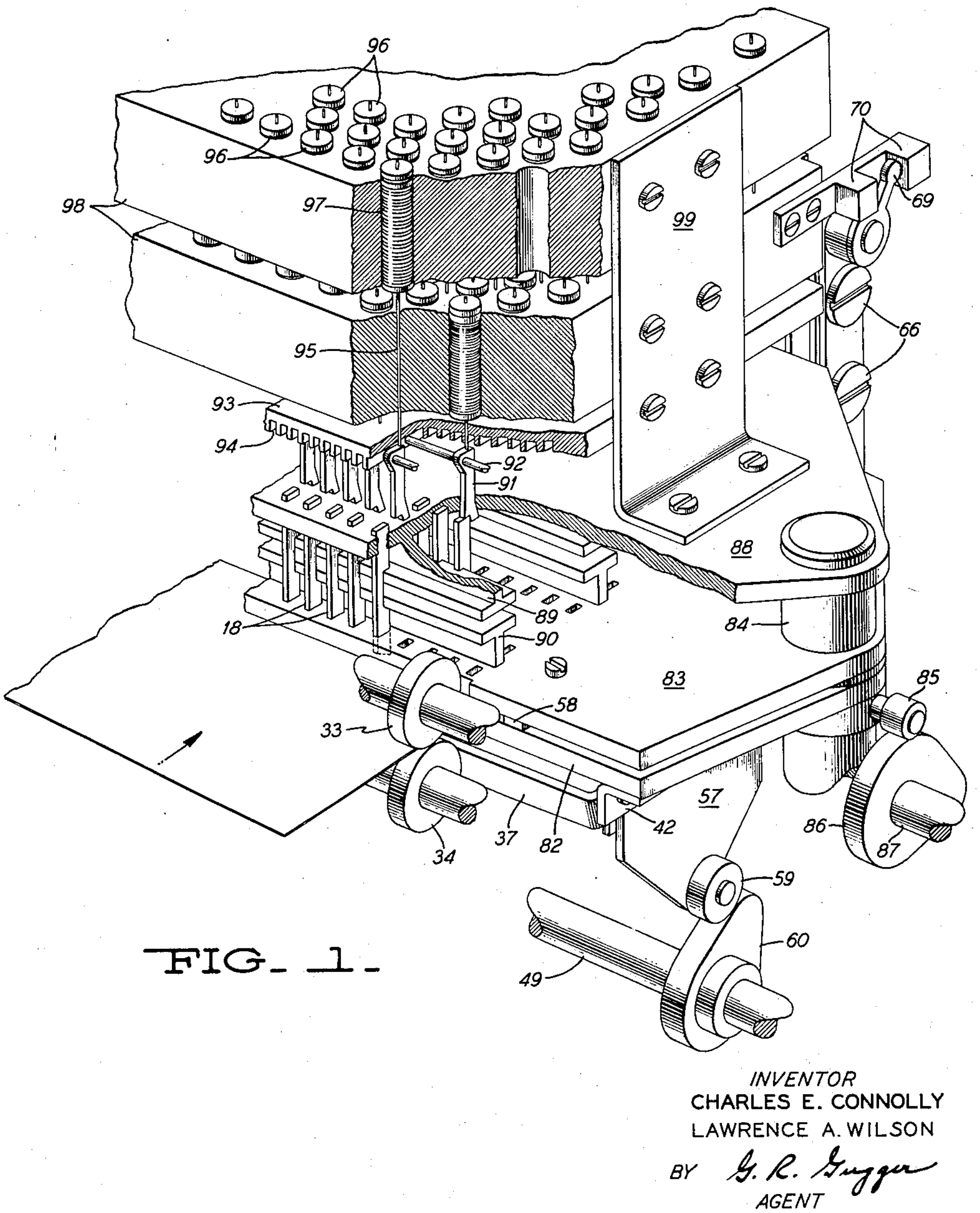
Fig. 1 is an isometric view of the punching mechanism showing the arrangement of the punch magnets, punch magnet interposers and the punches.

With the bail in the raised position as shown in Fig. 6, the card patter 51 will assume substantially a vertical position along the left-hand vertical edge of the card in the punching station. When the bails are lowered, it can be seen that the card patter is pivoted clockwise against the card to force the card toward the right against either a retractable side aligner plate 57 or a fixed aligner plate 58. Referring to Figs. 1 and 6, it will be seen that the retractable aligner plate 57 is slidably mounted in the lower half of the punching mechanism and carries at its lower extremity a roller 59 which is urged to follow the periphery of a cam 60 under tension of a spring 61 extending between the aligner plate and a bracket 62. The cam 60 is fixed to the continuously running shaft 49 and operates to reciprocate the aligner plate up and down once each machine cycle. During the first half of each cycle, the aligner plate 57 will be up and the card will accordingly be positioned for punching in all of the even numbered columns 2, 4, 6 through 80. At the close of punching of the even columns, the aligner bails 37 open and the aligner plate 57 is lowered allowing the card patter 51 to shift the card approximately .087 inch to the right against the fixed aligner plate 58 thus placing all of the odd numbered columns 1, 3, 5 . . . 79 in position to be punched. At the close of each cycle, the aligner bails are again opened and the aligner plate 57 raised to position the incoming card for punching in the even columns.

In using a punch and die unit of the present type where a great number of holes are punched at the same time on a card at rest, it is sometimes difficult to get the card out of the die and stripper unit, especially if the punches and die become dulled through long usage. The reason for this is that burrs may accumulate on the imperfect holes and stick down in the holes in the die, thus, sometimes a considerable push or pull is required to get the card free. In the present machine there is provided an improved eject mechanism designed to grip the card positively and pull the card out of the die station into feed rollers at the correct speed and then open after the rollers have control of the card.

Figure 2:
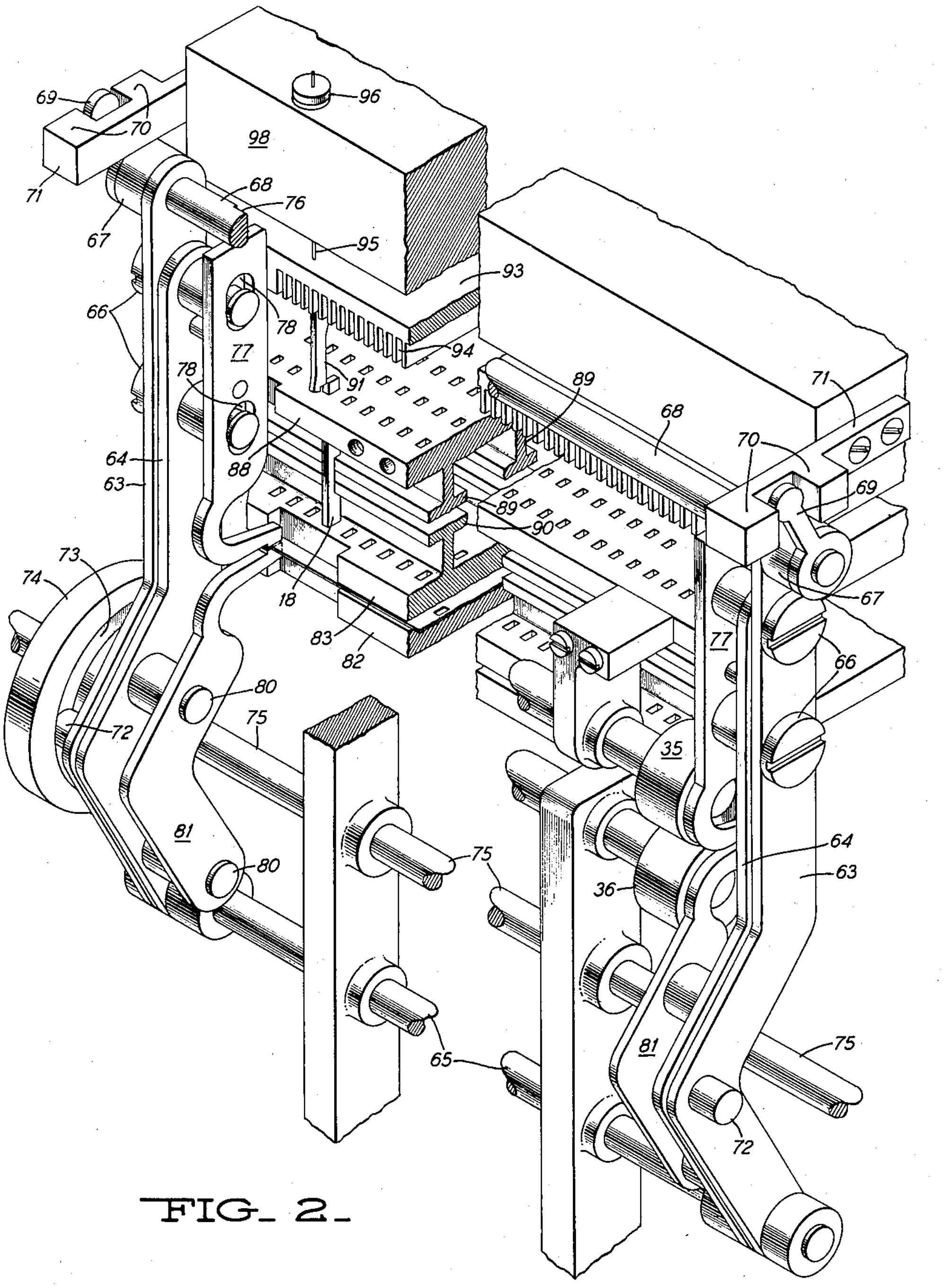
Fig. 2 is an isometric view of the punching mechanism showing the operating mechanism for the card eject grippers.

Referring to Figs. 2 and 3, the card eject mechanism comprises two card gripper assemblies, one on each side of the machine. Each assembly includes a pair of vertical drive links 63, 64 pivoted at their lower extremities to a support shaft 65 and each pair of drive links is connected together by means of a pair of screw studs 66. The upper extremities of the drive links 63 include bearing members 67 which rotatably support a cam shaft 68. Fastened at each end of the cam shaft is an operating lever 69 which extends upward between a pair of projections 70 of an associated bar 71 fastened to the side of the punch mechanism.

Each link 63 carries on its outside face a stud 72 which is arranged to ride in the groove 73 of a cam 74 adjacent thereto. The pair of cams 74 are fastened to a continuously running shaft 75. Referring to Fig. 3, it can be seen that the cam grooves 73 are arranged to cause the drive links to pivot about shaft 65 to the right away from the die mechanism and then back to the left to their home position adjacent the punch mechanism once each cycle.

As the drive links pivot about the shaft 65, the cam shaft 68 is caused to rotate in the bearing members 67 through the action of the levers 69 and projections 70. The cam shaft includes a notched portion 76 which coacts with a pair of upper card grippers 77 mounted on the drive links 64. The upper grippers are slidably mounted for vertical movement through elongated holes 78 which receive the screw studs 66 and each gripper is normally urged upward against the notched portion of the cam shaft by means of a spring 79.

Fastened rigidly to each drive link 64 through spacer studs 80 is a lower card gripper 81 which cooperates with its related upper gripper to grip each card and positively eject it from the die station. As shown in Fig. 3, the grippers are in the position where they would be gripping a card in the die station which is undergoing the second half of the punching cycle. At the end of the cycle, the grippers will be moved away from the die station a sufficient amount to feed the card into the bite of the eject rolls 35, 36. As the card enters the eject rolls, the upper card grippers 77 are moved upward through the action of springs 79 and the shaft 68 to release the card. During the first half of the next cycle the grippers are returned to their position adjacent the die and the upper grippers lowered to grip the next card during the second half of its punching cycle. Thus, it can be seen that after each card is punched it is forced in a positive manner into the eject rolls to eliminate any possibility of a card jam occurring at the die station.

*Punching Mechanism*

Referring to Fig. 1, the card to be punched is fed in between a die plate 82 and a stripper plate 83 both of which are mounted for vertical movement on a pair of guide rods 84. Attached at each side of the die plate is a roller member 85 and the roller members are supported on a pair of cams 86 fastened on a continuously running shaft 87. The shaft 87 and cams 86 are arranged to make two revolutions per machine cycle thereby effecting the raising and lowering of the die and stripper plates twice each cycle to carry out the two step punching operation. Fastened at the top of the guide rods 84 is a punch guide plate 88 which is provided with rows of holes which slidably receive the individual punch elements 18. In the present application where, for example, an IBM card having 80 columns of 12 index point positions or 960 possible punching positions is used, and where each card is to be completely punched in two operations, the plate 88 is arranged to carry 40 columns of 12 punching elements or 480 of the individual punches 18.

Integral with the guide plate 88 is a series of ribs 89 which extend down between adjacent rows of punches and each rib is provided with a double flange portion which extends into a notch in the individual punches to support them vertically. In similar fashion, a series of ribs 90 integral with the stripper plate 83 extend up between the adjacent rows of punches with each rib being provided with a double flange portion which extends into the notches in the punches for the purpose of restoring the punches after a punching operation.

The punch set up mechanism includes a plurality of interposers 91, one associated with each punch, arranged in rows and pivotally mounted on rods 92 which are anchored in an interposer guide plate 93. The underside of plate 93 is provided with slots 94 which receive and guide the upper extremities of the interposers. The upper extremity of each interposer is connected by means of a wire 95 to the armature 96 of a related punch magnet 97. The punch magnets are mounted in a pair of mounting bars 98 fastened between a pair of brackets 99 fixed on the plate 88.

Referring to Fig. 3, it may be seen that the lower extremities of the interposers are notched and that they are normally out of alignment with the punches when the punch magnets are not energized. Under these conditions, when the die and stripper are cammed upward, the punches are free to be moved upward by the card in the die station and no punching will take place, however, when a punch magnet is energized, such as is indicated at the left end of the lower mounting plate 98, its armature and push wire will move down causing the related interposer to pivot against the action of a restoring spring 100 until the notched end of the interposer hooks over the end of the associated punch. Now when the card is moved upward, the punch under the activated interposer is prevented from moving up with the card and punching is effected. The notched portion of each interposer is arranged to hook over the top surface of the punch element so that a locking action results making it unnecessary to hold the punch magnets energized. The armature and interposer will remain locked in the set up position after the magnet is de-energized and they will be restored through the action of springs 100 when the die and stripper plates reach the bottom of their downstroke at which point all of the punch elements will have been lowered enough by the flanged ribs 90 to relieve the locking action sufficiently to allow the springs 100 to do their work. Those punches which were moved upward by the card are restored by the flanged ribs 90 on the downstroke of the die and stripper plates.

*Electrical connections*

Referring to Fig. 8, when the main switch is closed, 110 volts A.C. is applied across the transformer T and rectifier R to provide a source of 40 volts D.C. across the two main lines 110 and 111 of the machine. Blank cards are inserted in the feed hopper P and the original or master cards are placed in the hopper R. The cards in hoppers P and R operate the respective hopper levers PRL and RHL, closing contacts PHC and RHC, and energizing relays R4 and R7 by a circuit which extends from line 110, wire 112, contacts PHC and RHC, relays R4 and R7, wire 113 and line 111. Now the start key is depressed to complete a circuit from line 110, wire 114, the start key, relay R19, wire 115 and line 111. Energization of relay R19 closes contacts R19*a* and completes a circuit from line 110, wire 116, normally closed contacts R18*a*, normally open contacts R19*a*, now transferred, contacts R7*d*, now closed, contacts R4*d*, now closed, the pick coil of relay R24 and line 111.

Upon energization of relay R24, a circuit is completed from line 110, wire 117, normally open contacts R24*c*, now closed, motor relay RHD and line 111. The energization of the motor relay RHD closes contacts RHD*a* and operates motor M through the 110 volt lines 118 and 119. Also, a circuit is completed to the punch clutch magnet PCM and the read clutch magnet RCM. This circuit extends from line 110, wire 120, contacts R24*a*, now closed, the normally closed side of contacts R1*b*, cam contact C1, punch clutch magnet PCM to line 111 and also from the R24*a* contacts, wire 121, the normally closed side of contacts R6*b*, wire 122, normally closed contacts R6*a*, contacts R7*e*, now closed, the cam contact C2, read clutch magnet RCM to line 111. Through the clutch connections thus made, the punch picker is operated to feed the first detail card out of the hopper and between the first set of feed rollers 31, 32 and the read picker is operated to feed the first master card out of the hopper and between the first set of feed rollers 27, 28.

When the first master card and first detail card have advanced a sufficient amount to close their respective card levers RCL1 and DCL circuits are completed to energize control relays R1 and R6. These circuits extend from line 110, wire 112, contacts DCLC and RCLC*a*, relays R1 and R6, wire 113 and line 111. On the next cycle the clutch connections are again established by the following circuits: line 110, wire 120, closed contacts R24*a*, wire 121, contacts R6*b*, now transferred, wire 123, wire 124, cam contact C1, punch clutch magnet PCM and line 111. Also, a circuit is completed from wire 124, plugwire connection 125 for reproducing, contacts R6*e* or R7*e*, now closed, cam contacts C2, read clutch magnet RCM and line 111. Thus, the read feed and punch feed will operate together again.

The relay R24 which was energized at the start of the first cycle through the depression of the start key will remain energized until near the end of the cycle through a circuit which extends from line 110, wire 126, cam contact P5, contacts R24*b*, closed, the hold coil of relay R24 and line 111. To prevent relay R24 from dropping out near the end of the first cycle, the start key is held for three cycles until the first detail card arrives at the punch brush station where it operates a punch brush card lever PBCL to complete a circuit from line 110, wire 112, punch brush contacts PBC, now closed, the pick coil of relay R10, wire 113 and line 111. Energization of relay R10 completes a hold circuit for relay R24 which extends from line 110, wire 116, the normally closed contacts R18*a*, punch stacker switch, contacts R6*d*, now closed, contacts R10*b*, now closed, contacts R1*a*, now closed, contacts R4*b*, now closed, contacts R24*b*, now closed, the hold coil of relay R24 and line 111. The motor M will now keep running and cards will be fed as long as they are present or until a stop key is depressed. Depression of the stop key will complete a circuit from line 110, the stop key, the hold coil of relay R18, wire 115 and line 111. The energization of the hold coil of relay R18 would open the contacts R18*a* to drop out relay R24 and thereby stop the machine.

The power for the analyzing mechanism is supplied from line 110 by way of sensing card lever contacts SCLC and a pair of cam contacts to the individual rotors 24*a* for each card column. There is shown schematically two orders of analyzing devices, one for an odd column and one for an even column on the record, and it is understood that in the present embodiment there are actually 80 such individual analyzing devices arranged adjacent each other to form a row across the machine, as shown in Fig. 7. In the absence of a card at the analyzing station the card lever contacts SCLC are opened and the rotors 24*a* are disconnected from the power supply. While the connection to the rotor 24*a* is shown by wires actually this is effected by the usual brush and collector ring arrangement.

Since the card in the punching station is punched in two operations, first the even columns and then the odd, the card at the analyzing station is sensed in two operations. During the first half of the cycle, the analyzing circuit extends from line 110, the sensing card lever contacts SCLC, wire 127, cam contacts 128 associated with the individual rotors for the even columns, a wire, such as 129, to each rotor 24*a*, brushes 23, contact points 22, the holes in the card, analyzing brushes 15, punch magnets PM and line 111. Thus, all of the punch magnet interposers corresponding to the perforations in the even numbered columns of the card are set up for the first punching operation. During the second half of the cycle, cam contacts 128 open and the analyzing circuit extends through cam contacts 130, now closed, and the individual rotors for the odd columns to set up the punch magnet interposers for the second punching operation. The cams operating cam contacts 128, 130 are continuously driven one revolution per cycle and alternate in completing circuits to the punch magnets.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine of the class described, a punching station including a plurality of punching instrumentalities, means for feeding a record to said punching station, means at said punching station for retaining said record in registered position to be acted upon by said punching instrumentalities, means for operating said instrumentalities to punch said record, means effective after punching to release said retaining means to free said record, means operable to shift said record transversely of its direction of feed, means for again operating said retaining means to register said shifted record, and means for operating said punching instrumentalities to punch said record a second time.

2. In a machine of the class described, a punching station including a plurality of punching instrumentalities, means for feeding a record to said punching station, aligner members at said punching station for engaging the leading and trailing edges of said record to retain said record in registered position to be acted upon by said punching instrumentalities, means for operating said instrumentalities to punch said record, means effective after punching to move said aligner members out of engagement with the edges of said record to free said record, a patter member operable to shift said record transversely of its direction of feed, means for again operating said aligner members to engage the leading and trailing edges of said record to retain said shifted record in registered position to be acted upon by said punching instrumentalities, and means for operating said punching instrumentalities to punch said record a second time.

References Cited in the file of this patent

UNITED STATES PATENTS

| | | |
|---|---|---|
| 1,916,966 | Cunningham | July 4, 1933 |
| 2,669,303 | Hendrich | Feb. 16, 1954 |

FOREIGN PATENTS

| | | |
|---|---|---|
| 508,954 | Great Britain | July 5, 1939 |